E. C. GEISSBERGER.
SPRING SUSPENSION FOR VEHICLES.
APPLICATION FILED NOV. 20, 1917.
1,347,154. Patented July 20, 1920.
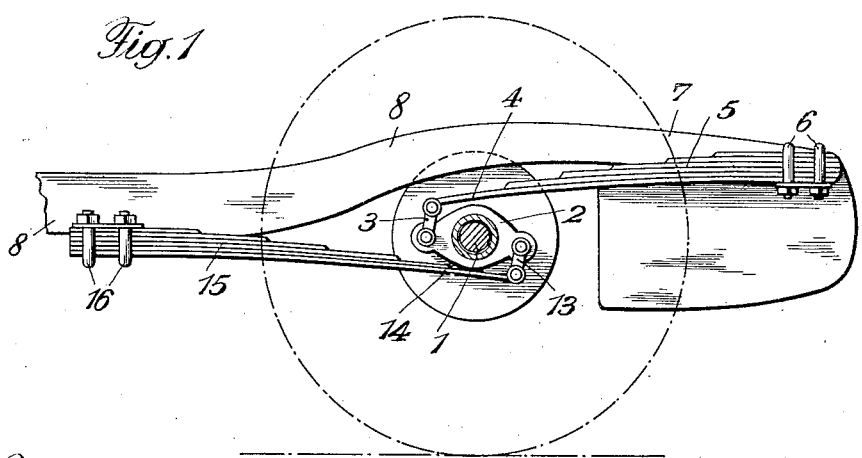
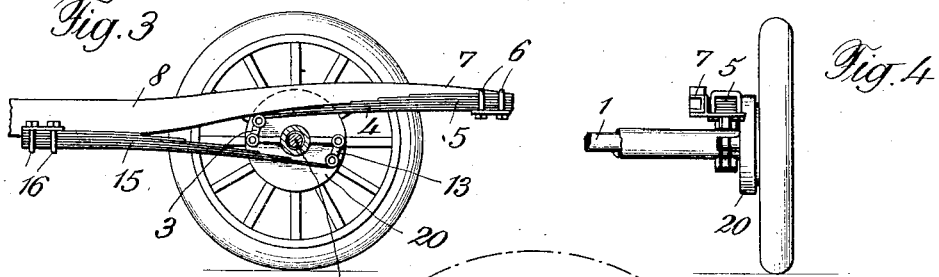
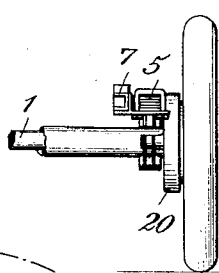
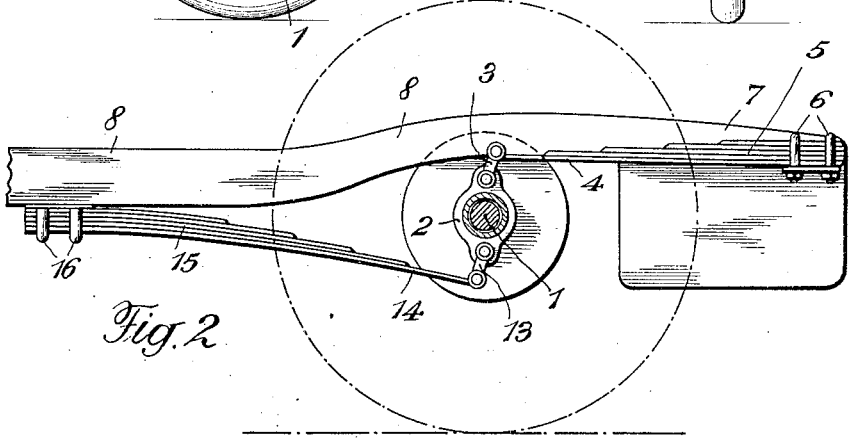
Inventor:
Emil C. Geissberger,

UNITED STATES PATENT OFFICE.

EMIL C. GEISSBERGER, OF ZURICH, SWITZERLAND.

SPRING SUSPENSION FOR VEHICLES.

1,347,154.  Specification of Letters Patent.  Patented July 20, 1920.

Application filed November 20, 1917. Serial No. 202,939.

*To all whom it may concern:*

Be it known that I, EMIL CASPAR GEISSBERGER, a citizen of the Republic of Switzerland, residing at Zurich, No. 6 Wiesenstrasse, Switzerland, have invented certain new and useful Improvements in Spring Suspensions for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a spring suspension for vehicles and particularly to a spring suspension for motor cars comprising two leaf springs.

The car springs hitherto known consist frequently of leaf- or laminated-springs, which comprise a plurality of leaf-like plates arranged in superposed layers. As a rule, the foot-ends of two such springs are arranged adjacent each other and they are connected by means of a spring strap or the like, one spring lying on the left hand side and the other on the right hand side of said strap. The axle is thereby fixed to the spring strap, while the outermost ends of the longest spring-leaf are fixed to the car frame. Another well known spring suspension is the so-called cantilever spring suspension, where the rear axle of the car is fixed to the free end of the longest spring-leaf and the spring strap is secured to the car frame toward the center of the car body. Compared with the first spring suspension referred to, the cantilever spring suspension has the advantage, in that the mass of the spring is fixed to the spring supported part of the car, so that the part, which is not spring supported, may be made somewhat lighter. As a result of this, a more sensitive and a better spring suspension of the rear axle is obtained. The great drawback of the cantilever spring suspension consists, however, in that the whole rear part of the car frame lying behind the point at which the spring is fixed to the frame, is unsupported. This has a detrimental influence on the carriage body, as the whole rear part of the latter together with the petrol tank and the luggage carrier, or in some cases the spare tires, are wholly unsupported, *i. e.* freely suspended behind the point at which the spring is fixed to the car frame. In consequence of this, and owing to the violent shocks continually occurring when driving on a rough road, the unsupported rear end of the car body has of course the tendency to bend rearward and downward, which has a detrimental influence on the back doors of the car body. The first kind of spring suspensions referred to has the drawback, that the mass of the spring is not spring supported, while on the other hand it has the advantage, that the car frame is supported up to its rearmost point, so that a perfectly stable support for the car body is obtained.

In order to improve the spring suspensions hereinbefore described, it has already been proposed to reverse the whole arrangement, *i. e.* to fix the free end of the longest spring-leaf to the axle and to secure, in the case where a so-called simple leaf-spring is provided, the spring strap to the end of the car. But this spring suspension also while comporting certain improvements, does not give the desired softness.

As the practical or useful limit for the length of the spring is determined, for instance in a motor car, on the one hand by the part of the under-frame extending beyond the axle and on the other hand, by the axle, it was not heretofore possible to improve the spring suspension by increasing the length of the spring. As a result of the present invention, it is now possible to improve the spring suspension and to increase the length of the spring even in the case where the length of the vehicle is already given.

The object of this invention is to provide a spring suspension for vehicles, particularly motor cars, comprising two leaf-springs fixed to the carriage and in which one of the springs is arranged in front and the other one behind the wheel axle. The free end of the longest spring-leaf of each of these two springs is connected with the axle to be spring supported and the arrangement is moreover such, that the two springs are suspended on the axle on opposite sides of the horizontal plane passing through this axle to be spring supported, so that the two springs may even overlap each other.

This invention will now be more particularly described with reference to the accompanying drawings, which illustrate several constructional examples of the invention.

In these drawings:

Figure 1 is a side view of a first embodiment of the novel spring suspension,

Fig. 2 is a corresponding side view of a second embodiment, and

Figs. 3 and 4 show a third embodiment.

In the construction illustrated in Fig. 1, 2 denotes a flange mounted on the rear axle 1 of a motor car. To this flange is secured the free end 4 of the longest spring-leaf of a laminated or leaf-spring 5 by means of a shackle 3 and also the free end 14 of the longest spring-leaf of a laminated or leaf-spring 15 by means of a shackle 13. The leaves of the laminated spring 5 are kept together by U-bolts 6 and those of the laminated spring 15 by means of U-bolts 16. The U-bolts 6 are fixed to the unsupported rear end 7 of a car frame 8 and the U-bolts 16 are fixed to the frame on the opposite side of the axle 1. In this spring suspension any spring-mass which is not spring supported, is eliminated and the car frame is supported up to its rearmost point. Owing to the overlapping of the two springs in the manner shown in Fig. 1, longer springs may be used without making the part of the car frame extending rearward too long.

Fig. 2 shows how two springs having different lengths may be used.

It is evident, that the two springs employed may have the same or different strength. According to this invention, the point of attachment of the longest spring-leaf may be arranged, should necessity arise, still farther away from the axle. Thus, the end of the longest spring-leaf may be fixed, for instance, to the casing 20 of the brake drum (see Figs. 3 and 4) in which case the springs may be made, for a given length of the car, still longer than in the first two embodiments illustrated.

The spring suspension according to this invention is particularly adapted to be used as front spring suspension, i. e. to act as a spring support for the front axle. As the front spring suspensions hitherto used were very deficient, a fact that had a very detrimental influence on the spring suspension of the whole car, it is evident, that this novel spring suspension applied to the front axle represents a great improvement. When driving, the shocks are first transmitted to the front axle, from where they are then immediately transmitted to the whole car frame, so that a smooth running of a car provided with a deficient spring suspension for the front axle could not even be obtained in those cases, where the spring suspension of the rear axle was a very good one. This drawback is remedied by the present invention.

I claim:

1. A spring suspension for vehicles comprising a spring composed of leaves arranged forwardly of the axle and fixed at one end to the car frame, a second similar spring arranged rearwardly of the axle and connected to the car frame, the end of the longest leaves of the springs lying on opposite sides of a horizontal plane through the axle, and a shackle for connecting the end of the longest leaf of each of said springs to the axle, whereby said springs are enabled to have movement independent of each other.

2. A spring suspension for vehicles comprising a spring composed of leaves arranged forwardly of the axle and fixed at one end to the car frame, a second similar spring of different length arranged rearwardly of the axle and connected to the car frame, the ends of the longest leaves of the springs lying on opposite sides of a horizontal plane through the axle, and a shackle for connecting the end of the longest leaf of each of said springs to the axle, whereby said springs are enabled to have movement independent of each other.

3. A spring suspension for vehicles comprising a spring composed of leaves arranged forwardly of the axle and fixed at one end to the car frame, a second similar spring arranged rearwardly of the axle and connected to the car frame, the ends of the longest leaves of the springs overlapping and lying on opposite sides of a horizontal axial plane through the axle, and a shackle for connecting the end of the longest leaf of each of said springs to the axle, whereby said springs are enabled to have movement independent of each other.

4. A spring suspension for vehicles comprising a spring composed of leaves arranged forwardly of the axle and fixed at one end to the car frame, a second similar spring of different length arranged rearwardly of the axle and connected to the car frame, the ends of the longest leaves of the springs overlapping and lying on opposite sides of a horizontal axial plane through the axle, and a shackle for connecting the end of the longest leaf of each of said springs to the axle, whereby said springs are enabled to have movement independent of each other.

In testimony that I claim the foregoing as my invention, I have signed my name.

EMIL C. GEISSBERGER.